United States Patent [19]

Clifton

[11] Patent Number: 5,339,892
[45] Date of Patent: Aug. 23, 1994

[54] HEAT EXCHANGE DEVICE

[75] Inventor: Brian Clifton, Cleethorpes, Great Britain

[73] Assignee: APV Corporation Limited, England

[21] Appl. No.: 992,081

[22] Filed: Dec. 17, 1992

[30] Foreign Application Priority Data

Dec. 17, 1991 [GB] United Kingdom ............... 9126706

[51] Int. Cl.⁵ ............................................. F28F 3/12
[52] U.S. Cl. .................................. 165/82; 165/168; 62/DIG. 7
[58] Field of Search .................. 165/81, 82, 168, 170; 62/DIG. 7

[56] References Cited

U.S. PATENT DOCUMENTS

| | | | |
|---|---|---|---|
| 1,775,819 | 9/1930 | Fischer et al. | 165/170 |
| 2,405,432 | 8/1946 | Kleist | 62/DIG. 7 |
| 2,436,390 | 2/1948 | Kleist | 62/DIG. 7 |
| 2,607,201 | 8/1952 | Kleist | 62/DIG. 7 |
| 2,607,203 | 8/1952 | Kleist | 62/DIG. 7 |
| 2,695,514 | 11/1954 | Brown | 165/82 |
| 3,447,598 | 6/1969 | Kaess, Jr. | 165/82 |
| 4,003,687 | 1/1977 | Hedin | 165/168 |
| 4,205,662 | 6/1980 | Rhodes et al. | 165/81 |
| 4,306,616 | 12/1981 | Woods, Jr. et al. | 165/170 |
| 4,308,857 | 1/1982 | Sims | 165/168 |

FOREIGN PATENT DOCUMENTS 473045  9/1975  U.S.S.R. ................ 165/170

*Primary Examiner*—John Rivell
*Assistant Examiner*—L. R. Leo
*Attorney, Agent, or Firm*—Charles D. Gunter, Jr.

[57] ABSTRACT

The present invention provides a heat exchanger member adapted to extract or impart thermal energy from or to a body, which member comprises:
 a. a substantially solid core member having bores therethrough through which heat exchange medium can flow; and
 b. an outer cladding of stainless steel over at least those areas of the member to be in direct contact with the body.

8 Claims, 4 Drawing Sheets

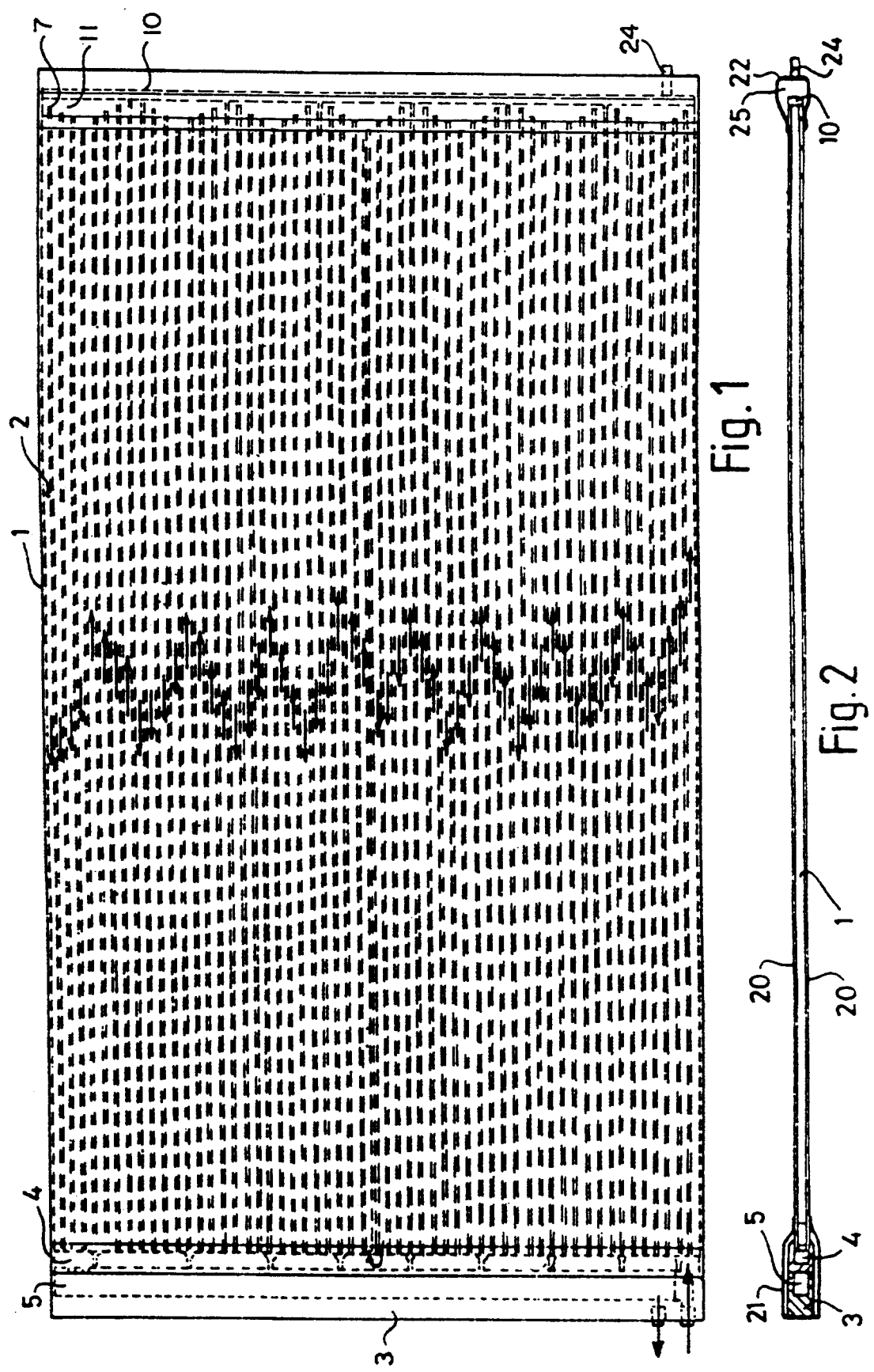

HEAT EXCHANGE DEVICE

The present invention relates to a heat exchange device, notably to a heat exchanger plate for a plate freezer.

BACKGROUND TO THE INVENTION

Many foodstuffs are heated, cooled, frozen or otherwise treated thermally by holding them in, or passing them through, the parallel gaps between adjacent horizontal plates of an horizontal plate heat exchanger, for example an horizontal plate freezer; or by holding the foodstuff in the vertical gap between adjacent vertical heat exchanger plates, for example of a vertical plate freezer. In the case of a horizontal plate freezer, the foodstuff can be loaded and unloaded manually or automatically and this form of freezer is of primary use in the treatment of discrete individual units of the foodstuff, for example containers of prepared meals and the like. In the vertical plate freezer, the foodstuff is usually loaded into the vertical chamber between adjacent plates manually and as a fluent mass of the foodstuff, for example as a slurry, as with a fruit juice or puree, or as a mass of small units of the foodstuff which are not kept discrete, as with a mass of loose fish or meat which is to form a frozen block. For convenience, the invention will be described hereinafter in terms of vertical heat exchange plates, notably a vertical plate freezer, although it can equally be applied to a horizontal plate freezer or other heat exchanger.

Heat exchange fluid flows through bores or conduits within the structure of the heat exchange plate to supply heat to or remove heat from the foodstuff. Such plates are usually large, typically ranging from 0.5 to 2.5 metres by from 1 to 4 metres and are made by extruding the plate from one or more blocks of solid metal. Initially, such plates were made from mild steel, but this was replaced by the use of aluminiumas aluminium extrusion techniques became accepted in the metal fabrication industry.

However, despite the advantageous thermal properties of aluminium, its use gives rise to problems. Due to the ease with which aluminiumforms a food-soluble oxide/hydroxide on its surface when left in contact with food for prolonged periods, care has to be taken during the use and cleaning of aluminium freezer plates between uses to minimise the risk of such corrosion and contamination occurring. In some countries, for example the USA, the use of bare aluminiumin contact with foodstuffs under conditions where contamination of the foodstuff could occur presents particular health problems. In some applications, for example in the canning of food or beverages, it is possible to apply a protective plastic or other coating to the exposed aluminium surface. However, where solids are being handled, as with blocks of foodstuff or meal portions in metallic containers, abrasion and erosion of surface coatings will occur, notably on load-bearing surfaces as present in a plate freezer. Such coatings are not therefore practical in such applications.

Stainless steel is corrosion resistant and finds widespread use in the food processing industry. Stainless steel cannot be cast or extruded and must therefore be machined or pressed where complex shapes are required. However, stainless steel is difficult to machine and its large scale use has been restricted to applications where the metal can be formed into the desired shape by pressing, for example in heat exchanger plates which are pressed out from sheet metal. It has been considered impractical and uneconomic to manufacture a freezer plate wholly from solid stainless steel.

It has been proposed to fabricate a freezer plate from a serpentine tube, which is to carry the heat exchange fluid, sandwiched between galvanised steel or stainless steel sheets. However, since the tube contacts the adjacent sheets along only a narrow line of contact, such plates give poor and uneven heat transfer from the tube to the sheet. This results in high energy input requirements to operate the plate freezer effectively, and in localised areas of excessive and/or insufficient freezing of the foodstuff in contact with the sheets. In general, such plate freezers have been superseded by the use of extruded aluminium plates which give more uniform freezing of the foodstuff and, due to the high thermal conductivity of aluminium as compared to steel or stainless steel, give greater heat efficiencies.

In an attempt to overcome the poor and uneven heat performance of such sandwich type plates, it has been proposed to fill the internal space in the plate between the tube and the sheets with a eutectic material. Whilst this aids heat transfer between the tube and the sheets and provides a more even thermal transfer over the surface of the sheets, such a system is not suitable for use in vertical plate freezers. In such freezers, the foodstuff is usually frozen as a solid block between the plates. Such a block readily adheres to the faces of the plates and cannot be removed. It is therefore necessary to pass a heating medium through the plate partially to melt the block of frozen material immediately adjacent to the plate surface. With a plate filled with a eutectic fluid, the thermal properties of the fluid prevent rapid heating and cooling of the sheets forming the external faces of the plate. Therefore, any re-heating of the cold plate will occur slowly and extensive partial thawing of the foodstuff block between the plates will occur, which is unacceptable.

Due to the problems of fabrication and thermal efficiency with stainless steel, and despite the problem of potential food contamination, aluminium continues to be used as the material from which plate freezers plates are manufactured. In those cases where unacceptable contamination problems could arise, it has been accepted in the food processing industry that alternative methods for freezing foodstuffs have to be used. Thus, the foodstuff is usually packed in individual closed containers, for example metal cans, and the contents of the containers are frozen by holding the containers in a cold store for several days, which is clearly inefficient and time consuming.

We have now devised a form of freezer plate construction which reduces the above problems.

SUMMARY OF THE INVENTION

Accordingly, the present invention provides a heat exchanger member adapted to extract or impart thermal energy from or to a body, which member comprises:
 a. a substantially solid core member having bores therethrough through which heat exchange medium can flow; and
 b. an outer cladding of stainless steel over at least those areas of the member to be in direct contact with the body.

From another aspect, the invention provides a method for subjecting a material to thermal treatment, which method comprises placing the material in thermal contact with the surface of the cladding of an heat exchanger plate of the invention and passing an heat exchange fluid through the core thereof so as to extract heat from or supply heat to the material.

Preferably, the cladding is capable of relative movement with respect to the core member whereby differences in the thermal expansion and contraction thereof can be accommodated with reduced stresses between the cladding and the core. It is particularly preferred that the envelope of the stainless steel cladding be subjected to an internal vacuum whereby the cladding is caused to conform closely to the outer face of the solid core and yet the cladding can move in sliding engagement with the core to accommodate differences in thermal expansion or contraction.

The term core is used herein to denote the thermally conductive structure through which the heat exchange fluid is to flow within the plate and can take the form of a conventional extruded or machined aluminium or other high thermally conductive material block as used in the fabrication of a conventional freezer plate or the like. However, the core can take others forms, for example a fritted or pressure bonded metal or ceramic powder, in which the member is substantially solid and the bores to carry the heat exchange medium are formed therein. The core can be formed as a unitary member or can be built up from a number of units, for example from individual modules which may be the same or different.

The term cladding is used herein to denote the separate outer envelope or skin applied to the operative parts of the core and can thus be a sheet applied over only that face of the member to be in direct thermal or physical contact with the body to which heat is to be applied or extracted. However, it is preferred that the cladding take the form of an outer box or the like within which the core is located. Optionally, the box has an open face through which the core is inserted or the box can be fabricated around the core so as to provide a closed container enclosing the core. Preferably, the stainless steel cladding extends over substantially all of the operative faces of the member and the cladding is provided by sheet metal which is held in heat exchange contact with the core by the application of the vacuum there between.

For convenience, the invention will be described hereinafter in terms of a core for a freezer plate which is enclosed within a stainless steel cladding.

As indicated above, the core can take the form of a substantially conventional aluminium block as used in a plate freezer, except that the external dimensions may require reduction to accommodate the thickness of the cladding where the freezer plate is to replace a plate in an existing freezer assembly. Thus, the core can be a generally rectangular block of aluminium with the necessary heat exchange fluid bores or conduits formed therein using conventional extrusion techniques. If desired, the core can be formed form a series of modular units where the overall plate is large, in which case the modules may carry lateral flanges, grooves or the like whereby they can be interconnected along adjacent edges.

The cladding can be applied only to that face of the plate to be in contact with the blocks of food or other material to be chilled or frozen by contact with the plate. However, it is preferred to form the cladding as a box-like structure by welding or otherwise securing together plates of suitable gauge stainless steel sheeting, into which the core is inserted. Since the core member is substantially solid, it provides structural support to the overlying cladding sheets. The cladding can thus be formed from thinner gauge sheets than the earlier proposals in which the sheets sandwiched a serpentine tube which give only localised support. The cladding is preferably of the minimum thickness required to support the vacuum and applied loads it is to bear, typically 1 to 2.5 mms, notably 1.25 to 2.0 mms, so as to reduce the loss in thermal transfer efficiency due to the nature of the cladding material. However, where thermal transfer is not occurring, for example at the end faces of the plate, the cladding can be thicker to provided greater strength, for example 2.5 to 5 mms.

If desired, the cladding can be formed as a composite structure with heat exchange conduits formed therein, for example by securing heat exchange plates to the inner face of the cladding to provide supplementary heat exchange passages through which steam or other heating medium can be passed at the end of the freezing cycle to release the frozen block from the faces of the plates without the need to interrupt the flow of cooling medium through the main bores in the core. Alternatively, the external face of the core member can be provided with grooves to provide the secondary heat exchange flow conduits.

From a further aspect, the invention provides a method of the invention in which a first cooling heat exchange fluid is passed through the bores in the core to achieve freezing of the material; and a second heat exchange fluid is passed through secondary bores in the cladding and/or the surface of the core whereby the material at or adjacent the cladding is caused to thaw whereby the frozen material can be released from the heat exchanger plate.

For convenience, the invention will be described hereinafter in terms of a cladding which is of a simple single sheet metal wall construction.

The cladding is preferably a close fit upon the external faces of the core so as to optimise the heat transfer between the core and the cladding. If desired, a heat exchange filler can be located between the inner face of the cladding and the core to maximise heat transfer between the core and the cladding and also to accommodate local unevenness in the surface of the core member. The filler may be assist lubrication between the opposed surfaces of the core and cladding.

As indicated above, the cladding and the core are constructed or secured together in such a way that they can move relative to one another so as to accommodate differences in thermal expansion or contraction between them. Thus, the core or the cladding can be provided with thermal expansion/contraction joints or bellows portions to achieve this where the cladding is secured to the core at a number of points. Alternatively, the cladding can be applied hot to a pre-chilled core so that the cladding is a shrunk fit onto the core member. However, it is particularly preferred to apply a vacuum between the cladding and the core so as to deform the cladding to lie against the core in direct heat exchange contact therewith and achieve a sliding contact which can accommodate the differences in expansion or contraction. Usually, this vacuum is drawn during manufacture of the freezer plate, for example through a valved outlet in an end face of the cladding, and the cladding then sealed to retain that vacuum subsequently. Alternatively, the vacuum may be drawn during use of the plate and released thereafter. For convenience, the invention will be described in terms of a plate where the vacuum is drawn during manufacture thereof and the cladding then sealed to retain the vacuum.

The vacuum can be drawn between the cladding and the core by any suitable method. For example, the cladding box can be provided with one or more valved outlets in one end or top face of the box through which the vacuum is drawn. Preferably, the external face of the core member is provided with a number of grooves to assist flow of air within the cladding to the valved outlet. Vacuum is then applied to draw the surfaces of the cladding onto the faces of the core and the outlet welded or otherwise sealingly closed off. Alternatively, the securing of the cladding upon the core can be carried out in a vacuum chamber, for example as may be required for the welding of the rim of the open end of a stainless steel cladding box into which the core has been inserted to the aluminium block of the core.

Alternatively, the vacuum can at least in part be formed during operation of the plate. Due to the different rates of thermal expansion and contraction between the aluminium core and the stainless steel cladding, the core will contract more and faster than the cladding. As a result any void spaces between the core and the cladding, for example at the end or top of the plate, will enlarge during cooling of the plate. This will create or increase the vacuum within cladding. In some cases this effect may provide all the internal vacuum within the plate which is required. However, it is usually preferred to draw at least sufficient vacuum during manufacture of the plate to ensure full contact between the cladding and the core over the operative faces of the plate.

The shape and dimensions of the core and the cladding can be varied over wide ranges to suit the particular freezer plate which they are to form and the usage to which that plate is to be put. However, apart from the stainless steel cladding, the plate can be designed, manufactured and operated in the conventional manner. However, due to the cladding, the problem of contamination of the food being frozen with the aluminium or other material of the core is avoided and the problems of poor heat transfer and machining with stainless steel for the core is overcome.

DESCRIPTION OF THE DRAWINGS

A preferred form of the freezer plate of the invention will now be described by way of illustration with respect to the accompanying drawings in which FIG. 1 is a diagrammatic vertical section through a plate of the invention; FIG. 2 is a diagrammatic horizontal section of the plate of FIG. 1.

DESCRIPTION OF THE PREFERRED EMBODIMENT

The plate of FIG. 1 comprises an aluminium block 1 having a series of heat exchange fluid flow bores 2 formed therein. Typically, such a core is formed by extruding aluminium through a suitable die to form the block and is of conventional design and construction. The bores 2 are preferably orientated so that they are substantially horizontal.

Figure 3:
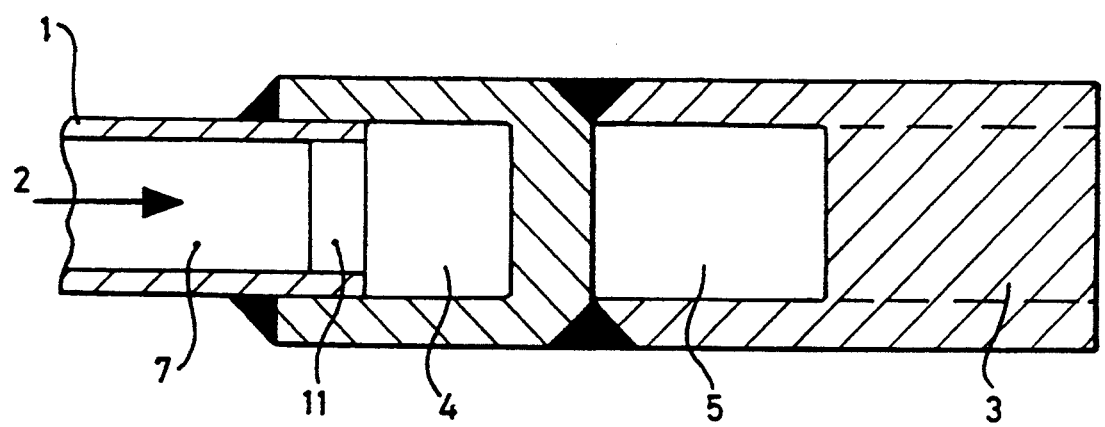
FIG. 3 is a detailed cross-section through the fluid flow and return passageways of the plate of FIG. 1.
Figure 4:
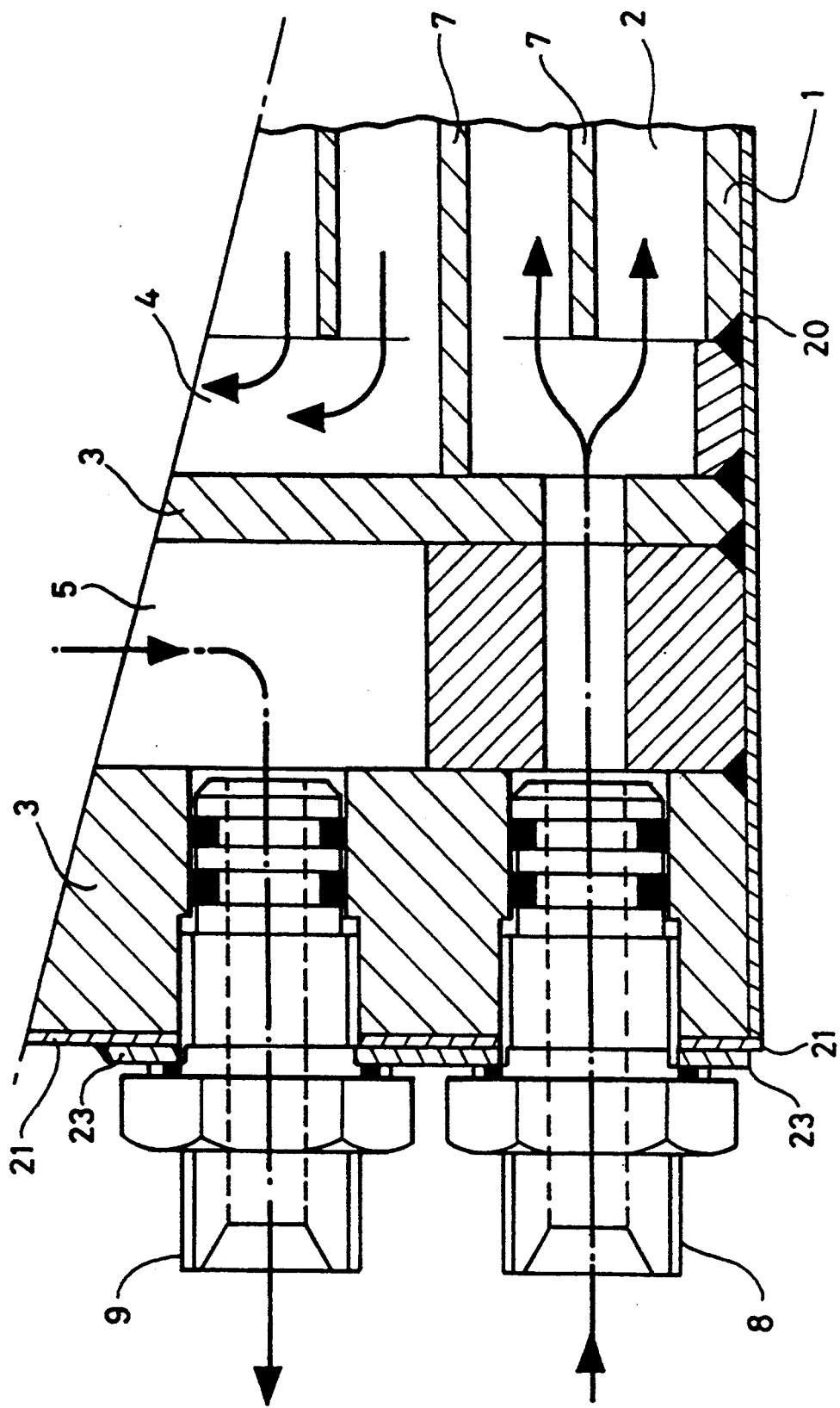
FIGS. 4 and 5 are detailed views of parts of the plate of FIG. 1.
Figure 5:
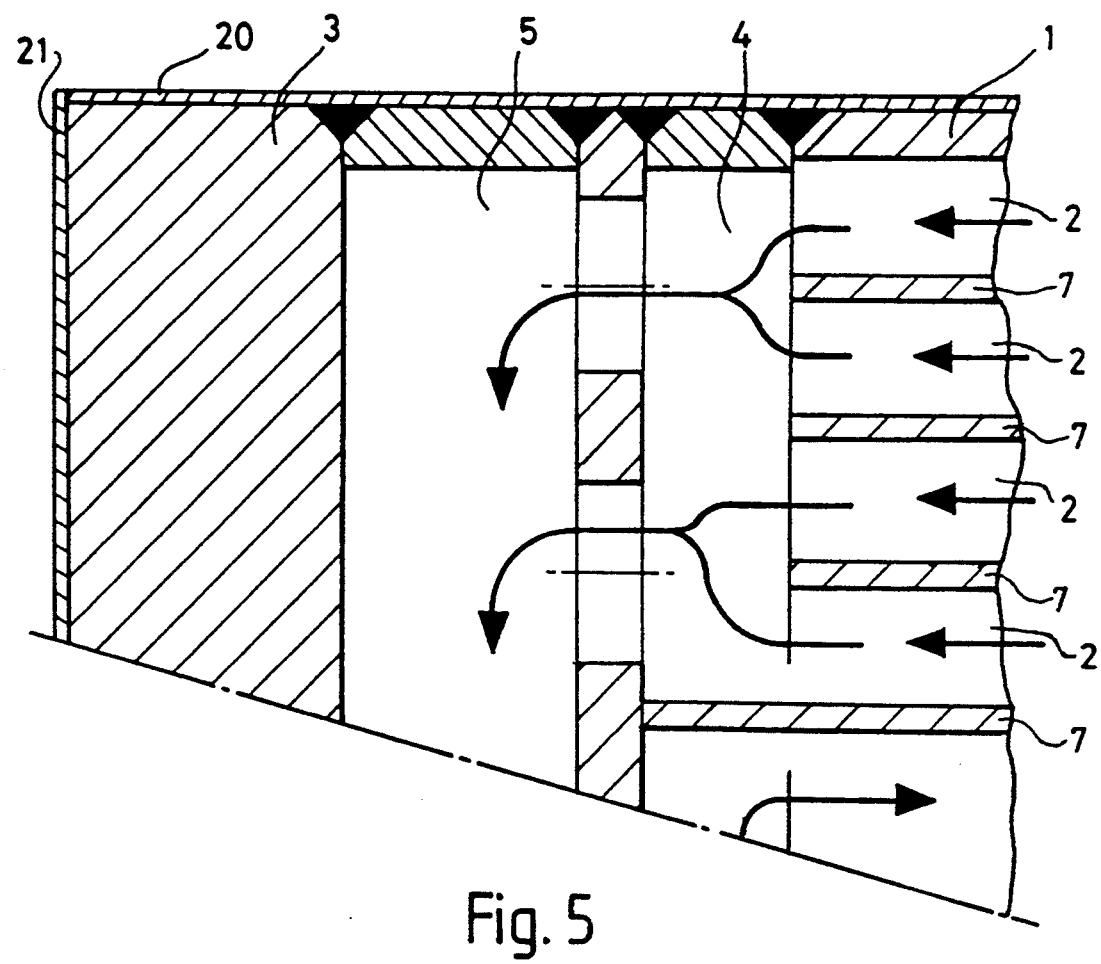

One end face of the block serves as the heat exchange fluid input/output face and is provided with an end cap 3 having fluid feed, flow, 4 and output, return, 5 passageways therein in fluid flow communication with the bores in the block. One of the passages, usually the flow passageway 4, is an open sided groove located adjacent the block (as shown in FIG. 3) and is interrupted by internal webs or sealing pieces extending between the wall of the passageway and the web wall between the bores in the block. Thus, as shown in detail in FIG. 4, the end of web wall 7 can extend across the full depth of passageway 4 to interrupt the flow of fluid along passageway 4. This has the effect of subdividing passage 4 into a series of sections each serving two or more of the bores 2 in the block 1 so that fluid flowing through the block 1 has to follow a serpentine path through the block from top to bottom or vice versa. The other, return, passageway 5 serves as the outlet of fluid once it has passed through the serpentine path through the block and is connected to the discharge bores, in this case the top bore or bores in block 1, by removing part or all of the web wall between the flow passageway 4 and the return passageway 5 at the appropriate length of the passageways as shown in FIG. 5. The passageways 4 and 5 are provided with any suitable inlet and outlet ports 8 and 9 for the feed and discharge of heat exchange fluid from the passageways.

The drawings show a single feed and return arrangement at the base of the block 1. However, the feed and return ports 8 and 9 can be located at any suitable location, for example at approximately the mid-height of the plate, and more than one feed and return port 8 and 9 can be used to provide a more complex sub-division of the flow of fluid through the bores in the block.

The other end of the block is provided with an end cap 10, which may also have flow and return passageways and connections as just described. However, a particularly preferred flow and return path is provided by mounting a simple bar end cap 10 over the exposed ends of the bores 2 in block 1 and cutting back the web wall 7 between adjacent bores so that a transverse port 11 is formed between those bores.

If desired, several adjacent bores can be grouped together by suitable porting in the end caps 3 and 10 and/or by cutting back the web walls 7 so that heat exchange fluid flows in the same direction through two, three or more adjacent bores as shown by the arrows in FIG. 1.

The block 1 is encased in a stainless steel cladding which lies in heat exchange contact with at least the two side faces of block 1. The cladding is conveniently formed by applying two opposed L cross-section sheets 20 to the block 1 so that the top and bottom lips of the two Ls overlap or butt together and welding the butt or overlap to form a closed sleeve around the block. The end faces of the block are encased with stainless steel end caps 21 and 22 which are welded to the side plates 20. If desired, reinforcement plates 23 or the like can be used to strengthen the end caps in the region of the fluid feed and discharge ports 8 and 9, as shown in FIG. 4. The end caps 21 and 22 are formed from thicker material than the side walls 20, for example from 2.5 mm sheet as opposed to the 1.6 mm sheet for the side walls. If desired, the ends of the plates 20 can be welded to a U shaped stainless steel end cap which serves to mount the plates 20 upon the aluminium core and to provided a substantially rigid end cap to the cladding so that any differential expansion between the core and the cladding is accommodated at the other end of the plate.

In order that a vacuum can be drawn on the cladding, it is preferred to provide one or more valved vacuum ports 24 in the end cap 22. As shown in FIG. 2, end cap 22 can be formed as a loose fit over that end of block 1 so that an internal air space 25 is formed within the cladding. As the block 1 cools, it will contract faster and to a greater extent than the cladding so that space 25 is enlarged and thus draws a vacuum within the cladding. This may be sufficient to draw all the vacuum required to ensure good thermal contact between the cladding and the block. However, it is preferred to draw sufficient initial vacuum within the cladding at ambient temperature to ensure that the cladding conforms to block 1 without the effect of cooling.

In use, the plate of FIG. 1 is installed in a vertical plane in a plate freezer in the normal way and foodstuff, for example loose fishes or fruit juice is fed to the chamber formed between adjacent plates in the normal way. Heat exchange fluid flows through feed port 8 to the bores 2 in the block 1 to chill or freeze the foodstuff in contact with the vertical faces of the plate. The plate thus can be used as a conventional heating or cooling plate, except that the food is not now in contact with the aluminium of the block 1. When freezing is completed the block of frozen foodstuff is removed from the chamber between adjacent plates. As indicated above, the frozen foodstuff may adhere strongly to the surface of the plate, even where this is given a coating of a plastic, for example polytetrafluoroethylene. It may therefore be necessary to pass a heating fluid through bores 2 to cause rapid thawing of the external faces of the frozen block. Alternatively, where the cladding has suitable secondary passages or the block 1 carries external grooves or secondary bores adjacent its outer faces, steam can be passed through those grooves or secondary passages to cause rapid thawing of the external faces of the frozen block without the need to interrupt the flow of freezing fluid through bores 2.

As stated above, the invention has been described in terms of a vertical plate for a freezer. However, the invention can be applied to the construction of plates for use in a horizontal freezer and to heating as opposed to freezing or cooling of foodstuffs.

What we claim is:

1. A cooling member adapted to cool a foodstuff, which member comprises:

a. a substantially solid core member having bores therethrough through which a cooling medium can flow; and b. an outer cladding of stainless steel extending over at least those areas of the cooling member which are to be in direct contact with the foodstuff, which caldding is adapted to be subjected to an internal vacuum whereby the cladding is caused to conform closely to the outer face of the core member and the cladding can move in sliding engagement relative to the core member whereby differences in thermal expansion or contraction between the cladding and the core member can be accommodated.

2. A cooling member as claimed in claim 1, wherein the core member comprises an extruded block of aluminum having passageways for the flow of cooling medium formed therein.

3. A cooling member as claimed in claim 1, wherein the bores within the core member follow a serpentine path.

4. A cooling member as claimed in claim 1, wherein the core member is wholly enclosed within the cladding.

5. A cooling member as claimed in claim 1, wherein the cladding is formed with cooling medium inlet and outlet ports and is provided with a rigid end cap securing the ports and the cladding to the core member.

6. A cooling member as claimed in claim 1, wherein one end of the cladding is provided with an end cap and a gap is provided between the end cap and an associated part of the core member, which gap is adapted to increase in volume as the core member contracts preferentially with respect to the cladding during at least the initial stages of cooling of the cooling medium, which increase in volume assists formation of the vacuum within the cladding.

7. A vertical plate freezer, wherein at least some of the plates are provided by a cooling member as claimed in claim 1.

8. A method for cooling a foodstuff, which method comprises placing the foodstuff in thermal contact with at least part of the surface of the cladding of a cooling member as claimed in claim 1; and passing a cooling medium through the core member thereof so as to extract heat from the foodstuff.

* * * * *